US006721295B1

(12) United States Patent
Brown

(10) Patent No.: US 6,721,295 B1
(45) Date of Patent: Apr. 13, 2004

(54) TRIPLE DATA SYSTEM FOR HIGH DATA RATE COMMUNICATION SYSTEMS

(75) Inventor: Katherine G. Brown, Coppell, TX (US)

(73) Assignee: Texas Instruments Incorporated, Dallas, TX (US)

(*) Notice: Subject to any disclaimer, the term of this patent is extended or adjusted under 35 U.S.C. 154(b) by 725 days.

(21) Appl. No.: 09/648,184

(22) Filed: Aug. 25, 2000

(51) Int. Cl.[7] ............................................. H04B 7/216
(52) U.S. Cl. ........................ 370/335; 370/342; 370/441; 370/535; 370/537; 370/412; 710/305; 327/407
(58) Field of Search ............................. 370/412, 417, 370/335, 342, 441, 350, 503, 535, 537, 428, 429; 375/150; 710/711; 327/407

(56) References Cited

U.S. PATENT DOCUMENTS

| 5,949,356 A | * | 9/1999 | Kim et al. ..................... 341/67 |
| 6,194,950 B1 | * | 2/2001 | Kibar et al. ................. 327/410 |
| 6,297,679 B1 | * | 10/2001 | Kim ............................. 327/276 |
| 6,404,758 B1 | * | 6/2002 | Wang .......................... 370/342 |
| 6,405,273 B1 | * | 6/2002 | Fleck et al. .................. 710/305 |
| 6,473,442 B1 | * | 10/2002 | Lundsjo et al. .............. 370/537 |
| 6,502,152 B1 | * | 12/2002 | Laurenti ...................... 710/264 |
| 6,611,512 B1 | * | 8/2003 | Burns .......................... 370/342 |
| 6,650,694 B1 | * | 11/2003 | Brown et al. ................ 375/150 |

OTHER PUBLICATIONS

Gatherer, Alan et al, "DSP–Based Architectures for Mobile Communications: Past, Present and Future", Jan. 2000, IEEE Communications.*

* cited by examiner

Primary Examiner—Ajit Patel
Assistant Examiner—Steven A. Blount
(74) Attorney, Agent, or Firm—Ronald O. Neerings; Wade James Brady, III; Frederick J. Telecky, Jr.

(57) ABSTRACT

A slot-aligned IQ data buffer scheme has a third buffer that allows a processing engine to slide the selection of a vector to be processed so that it aligns with the framing of the data. This is particularly advantageous for CDMA and WCDMA systems where there are overlaying coded data streams, each with its own frame timing, since data is processed cleanly at boundaries in the data such that the processing hardware can be minimized. A first level of muxing selects a pair of buffers having the data to be processed from among three buffers. A second level of muxing selects the sample number required. The third level of muxing selects the correct chips for the alignment of the slot. The third stage is implemented with a barrel shifter to minimize hardware generally associated with use of multiplexing.

18 Claims, 3 Drawing Sheets

TRIPLE DATA SYSTEM FOR HIGH DATA RATE COMMUNICATION SYSTEMS

RELATED PATENT APPLICATIONS

This application is related to U.S. patent application Ser. No. 09/607,410 entitled Correlator Co-Processor For CDMA RAKE Receiver Operations, filed on Jun. 30, 2000, by Katherine G. Brown et al now U.S. Pat. No. 6,650,694.

BACKGROUND OF THE INVENTION

1. Field of the Invention

This invention relates generally to data communication systems and methods, and more particularly to a minimally sized data buffer that allows vector processing of simultaneous frames of overlaying data in which the frames do not have the same starting position.

2. Description of the Prior Art

When using a data communication system based on bursts (packets), the generic format of a frame consists of a preamble at the beginning of each burst. Some communication protocols additionally include data and end-of-frame. The preamble is used to signify (recognize) the start of transmission. All nodes on a network traditionally use the same preamble and the same end-of-frame. Each node, therefore, is required to decode at least the beginning of the data to identify if this message is addressed to itself. Decoding efforts importantly require a real-time computational complexity. Further, traditional data communication processes are made even more complex and time consuming due to the necessity to utilize collision detection and resolve techniques.

Further, in code division multiple access (CDMA) systems, as well as others, there are overlaying coded data streams, each having its own frame timing. In view of the foregoing, it is therefore desirable to provide a technique to minimize or even reduce communication system real-time computational complexity and hardware requirements associated with processing simultaneous frames of overlaying data in which the frames do not have the same starting position for such systems. One solution could include using a double buffer scheme, but such a scheme does not address the foregoing undesirable hardware complexity issues.

SUMMARY OF THE INVENTION

The present invention is directed to a-triple data buffer for supporting high bit rate data communication systems such as the correlator co-processor (CCP) disclosed in U.S. patent application Ser. No. 09/607,410 entitled Correlator Co-Processor For CDMA RAKE Receiver Operations, filed on Jun. 30, 2000, by Katherine G. Brown et al. The CCP is capable of receiving multiple in-phase (I) and quadrature (Q) signal samples from-multiple sources to accommodate antenna diversity wherein I and Q samples may be 6-bits or more. The I and Q samples further represent multiple overlaying channels, each of which have several multi-path elements, the aggregate data rate being possibly greater than the chip rate. The triple data buffer is a slot-aligned IQ buffer comprising three 16-chip buffers which are filled circularly. According to one embodiment, each of the 16-chip buffers contains 64 (4× oversampled) samples of 12-bits (6 for I and 6 for Q). When one of these 16-chip buffers is being processed, the one that holds the next 16chips is used to access extra chips which are not in the current buffer. The alignment of the task's frame determines the starting chip to be processed and then the next 15 chips are required to do the correlator vector processing which is 16 chips wide. At most, 15 more chips might be required from the next buffer. There are three 16-chip buffers, so that one buffer can be processed at any time while the next can be used to access extra chips for processing, and the third can be filled with incoming data. Frame alignment is accomplished using three levels of multiplexing. The first level selects a pair of buffers to be processed. The second level selects the sample number (0, 1, 2, 3 of the 4× oversamples) required. The third level selects the correct chips for the alignment of the slot and is implemented using a barrel shifter to provide a smaller configuration than necessary when using brute-force multiplexing techniques.

In one aspect of the invention, an IQ data buffer is implemented to accommodate selection of IQ data bits which align to the frame/slot timing of each task.

In still another aspect of the invention, an IQ data buffer is implemented to more easily accommodate compressed mode and change of service requirements when receiving data.

In yet another aspect of the invention, an IQ data buffer is implemented that provides a simple control logic capable of rendering improved testing features over known architectures.

Still another aspect of the invention is associated with an IQ data buffer that maximizes power efficiency when executing correlations.

BRIEF DESCRIPTION OF THE DRAWINGS

Other aspects and features of the present invention and many of the attendant advantages of the present invention will be readily appreciated as the same become better understood by reference to the following detailed description when considered in connection with the accompanying drawings in which like reference numerals designate like parts throughout the figures thereof and wherein.

While the above-identified drawing figure sets forth a particular embodiment, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION OF THE PREFERRED EMBODIMENTS

Figure 1:
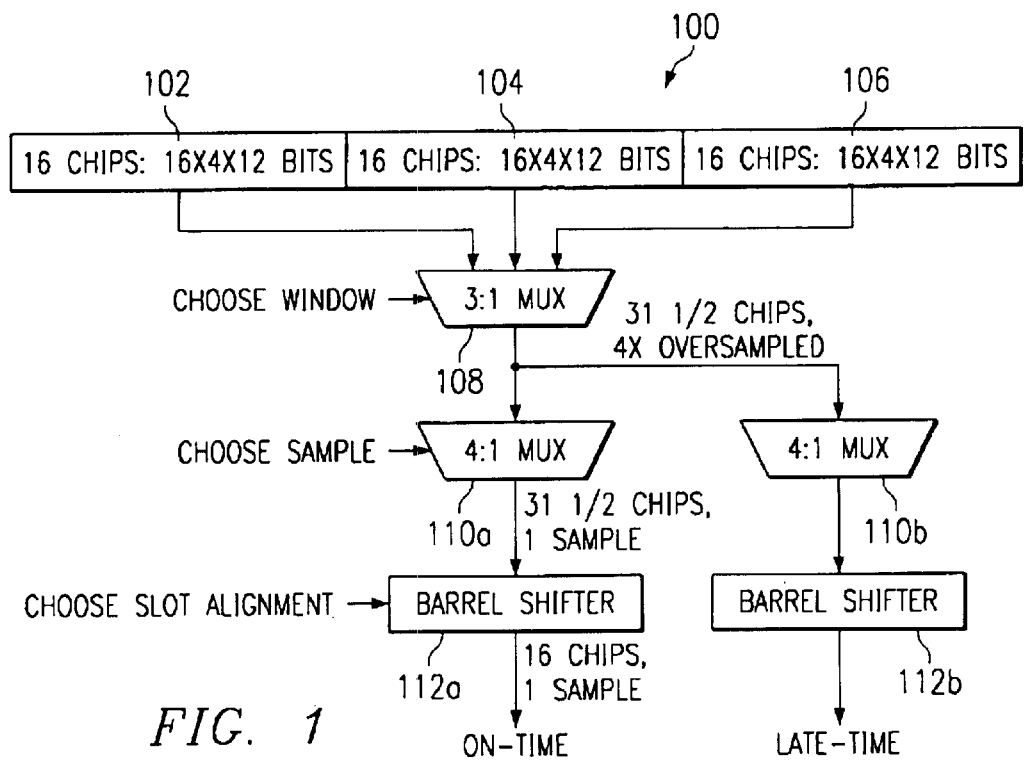
FIG. 1 is a block diagram illustrating a slot-aligned IQ buffer according to one embodiment of the present invention.

FIG. 1 is a block diagram illustrating a slot-aligned IQ buffer 100 according to one embodiment of the present invention. The slot-aligned IQ buffer 100 is a triple data buffer system that allows vector processing of simultaneous frames of overlaying data in which the frames do not have the same starting position. A first data buffer 102, second data buffer 104 and third data buffer 106 allow the processing engine, such as a DSP associated with the CCP discussed herein above, to slide the selection of the vector to be processed so that it aligns with the framing of the data. CDMA and WCDMA communications employ overlaying coded data streams, each having its own frame timing. The slot-aligned IQ buffer 100 is particularly advantageous for CDMA and WCDMA systems because it allows for vastly simplified processing hardware. Without this feature, a WCDMA vector chip processor would require significant additional hardware just to support the compressed mode of operation in WCDMA. The slot-aligned IQ buffer 100 therefore allows for changing the way data is processed cleanly at boundaries in the data without requiring additional hardware to accommodate such changes.

Looking again at FIG. 1, the slot-aligned IQ buffer 100 can be seen to include three 16-chip buffers 102, 104, 106. The buffers 102, 104, 106 are-filled circularly; and each buffer 102, 104, 106 contains 64 (4x oversampled) samples of 12-bits (6 for I and 6 for Q). When one of these 16-chip buffers 102, 104, 106 is being processed, the one which holds the next 16 chips is used to access the extra chips which are not in the current buffer. The_alignment of the task's frame determines the starting chip to be processed. The next 15 chips are then required t& implement the correlator vector processing which is 16 chips wide. At most, 15 more chips might be required from the next buffer. There are three buffers 102, 104, 106 such that when the data in one buffer is processed, the next buffer can be used to access extra chips for processing while the third can be filled with incoming data.

A certain amount of multiplexing is necessary in order to accomplish the frame alignment. The first level of multiplexing 108 selects two of the three buffers 102, 104, 106, in order to select chips for processing. The second level of multiplexing 110a, b, selects the sample number (0, 1, 2, 3 of the 4× oversamples) required. The third level of multiplexing 112a, b, selects the correct chips for the alignment of the slot from two buffers. This last stage of multiplexing 112a, b, is done with a barrel shifter to achieve a smaller implementation than that which can be provided when using simple brute-force multiplexing techniques.

Figure 3:
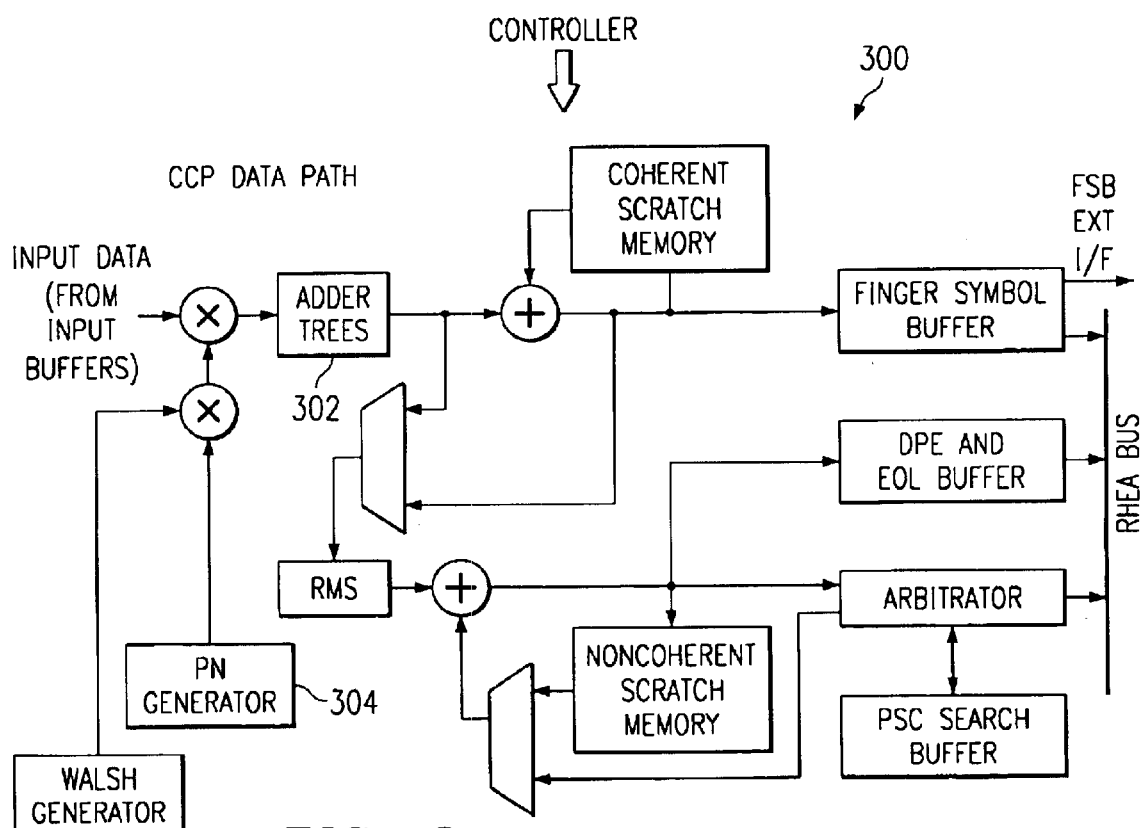
FIG. 3 illustrates a more detailed block diagram for the data path portion of the correlator co-processor system depicted in FIG. 2.
Figure 2:
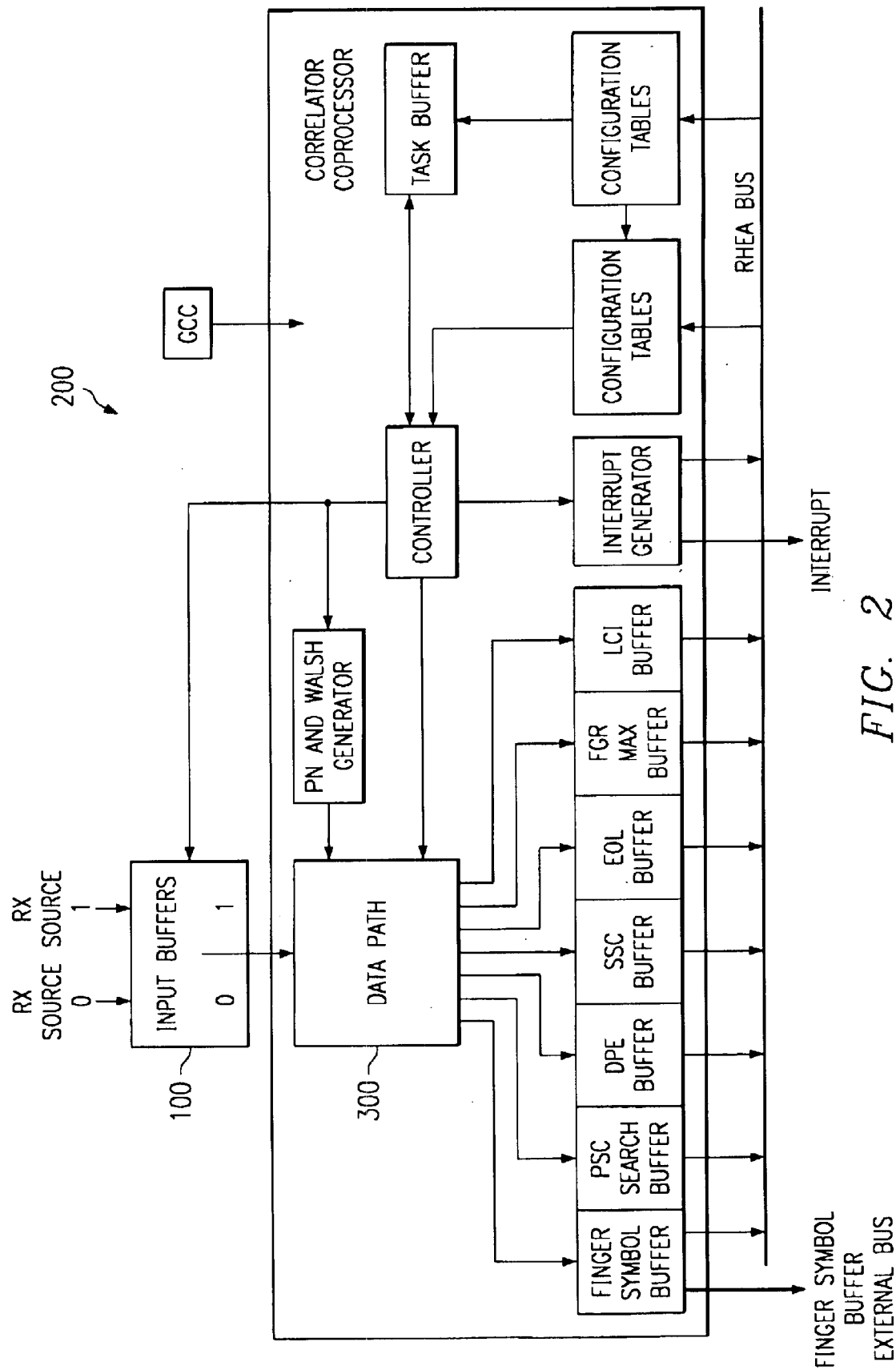
FIG. 2 is a top-level block diagram illustrating a correlator co-processor system in communication with a pair of slot-aligned IQ buffers.

FIG. 2 is a top-level block diagram illustrating a correlator co-processor system 200 in communication with a pair of slot-aligned IQ buffers 100 while FIG. 3 illustrates a more detailed block diagram for the data path portion 300 of the correlator co-processor system 200 depicted in FIG. 2. According to one embodiment, when using single or to even double data buffers, the CCP system 200 requires four adder trees 302 (2 for on-time and 2 for late-time) for information processing. When using the present triple data buffer implementation, the CCP system 200 requires a single adder tree for on-time and a single adder tree for late-time information processing. Without the triple data buffer 100, additional adder trees are necessary to accommodate information processing when the slot timing does not align with the 16-chip processing timing and there is a symbol boundary in the 16 chips. Use of triple data buffers was found to reduce overall power requirements associated with correlations over the double buffer feeding additional adder trees.

Since the present triple data buffer 100 is capable of allowing a 16-chip vector being processed to be aligned to the slot, the pseudo-noise (PN) generator 304 can also be simplified to one which produces offset spaced 16 apart rather than one which simply produces any offset. Further, logic generally necessary to wrap data around to the beginning of the PN sequence can be eliminated, along with the linear feedback shift register (LFSR) implementation of the PN generator 304, since a window of sequential search hypotheses (+1 advance) no longer requires a PN sequence with the +1 advance feature.

Generally, when a finger timing change is required, the CCP system 100 hardware must be alerted as to the direction (+/−) and the new sample position. In the worst case condition, extra processing of another 16 chips must be accomplished at the same time as the current 16 chips. Because there is another tree 302 available since the late-time tree is not used for fingers, the number of trees 302 is adequate. Use of the present triple data buffer 100 scheme for the CCP system 100 will operate to retain the foregoing information processing characteristics, even when the first chip being processed is the first chip in the buffer 100 and the timing goes from 0 to 3 (earlier).

In view of the foregoing, CCP system 100 design is simplified when implemented using the present slot-aligned IQ buffer 100. The present inventor found, for example, although the same control logic needed to find the first symbol boundary in the 16 chips being processed is still necessary to find the alignment for the input multiplexers when using the present slot-aligned IQ buffer 100, the intricacies involved in SF=4 or 8, where there are multiple boundaries-are removed. Now, the adder trees 302 can be easily split into one, two, and four results without worry about where the symbol boundary is located. Further, coherent adder trees required for space-time transmit diversity (STTD) pilot accumulations was found to be simplified as was pilot de-rotation bit alignments since pilot symbols align within slot and 16-chip windows. In view of the above, it can be seen the logic requirements to dump results from a tree is advantageously simplified leading to reduced risks and test time requirements for a CCP system 100.

When a service is changed on a slot boundary, or when the symbol finger (SF) is changed on a slot boundary in the case of compressed mode, having the CCP system 100 hardware react and process the data after the boundary in a different way than the data before the boundary is simple when the processing of each of these is in a different iteration, as it would be with a slot-aligned IQ buffer 100. Without use of the present slot-aligned IQ buffer 100, the slot boundary will generally appear in the middle of a 16-chip processing window; and both types of processing will be required on the same iteration, requiring double the hardware resources.

Figure 4:
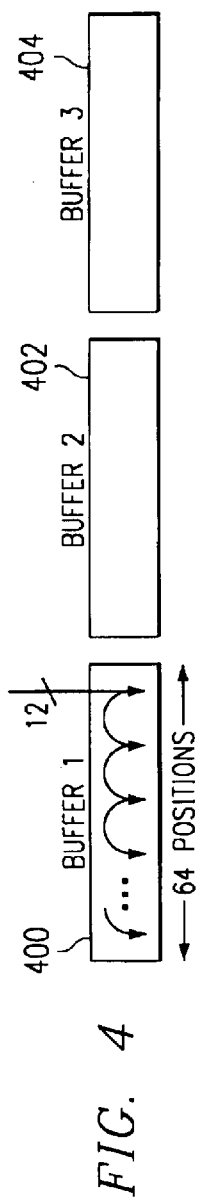
FIG. 4 is a diagram illustrating data flow through a series of shift registers to implement a slot-aligned IQ buffer system according to one embodiment of the present invention.

FIG. 4 is a diagram illustrating data flow through a series of shift registers 400, 402, 404, suitable to implement a slot-aligned IQ buffer system 100 according to one embodiment of the present invention. Twelve bits of IQ data are communicated to the first buffer 400 and are left shifted until the entire buffer 400 is full. The next IQ data received are then communicated into the next buffer 402 and so on.

Figure 5:
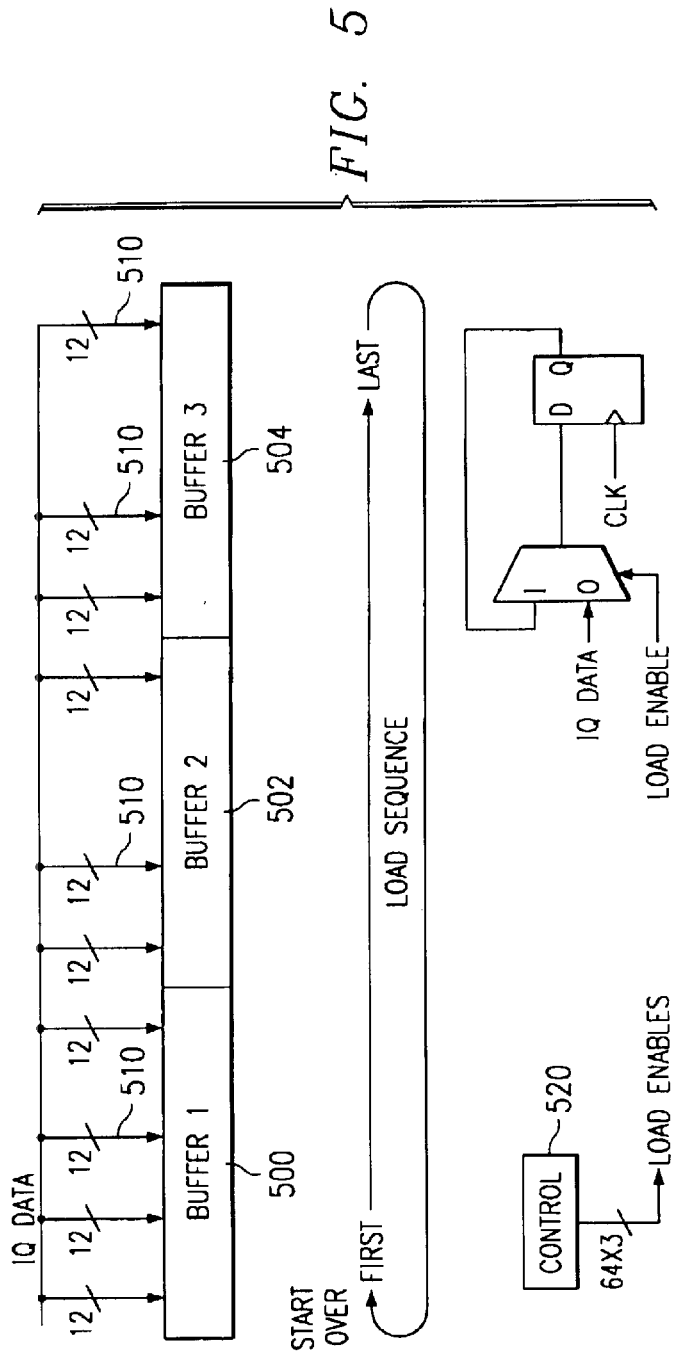
FIG. 5 is a diagram illustrating data flow through a group of load enabled registers to implement a slot-aligned IQ buffer system according to yet another embodiment of the present invention.

FIG. 5 is a diagram illustrating data flow through a group of load enabled registers 500, 502, 504, suitable to implement a slot-aligned IQ buffer system i 100 according to yet another embodiment of the present invention. This embodiment is preferred over the embodiment shown in FIG. 4 since this embodiment was found to require lower power to provide a working system. Twelve bits of IQ data are loaded into a desired buffer (register) location. Once loaded, the IQ data does not shift, but remains in its present location until it is read or overwritten. The twelve IQ data lines 510 are connected to each sample register 500, 502, 504 in parallel. A control block 520 enables the proper register 500, 502, 504 in which to load a sequence of data.

In view of the above, it can be seen the present invention presents a significant advancement in the art of CDMA and WCDMA information processing. A slot-aligned IQ buffer architecture has been implemented to accommodate easy and simple processing of data using minimal hardware resources, even when compressed mode and change of services occur at slot boundaries. Further, this invention has been described in considerable detail in order to provide those skilled in the data communication art with the information needed to apply the novel principles and to construct and use such specialized components as are required. In view of the foregoing descriptions, it should further be apparent that the present invention represents a significant departure from the prior art in construction and operation. However, while particular embodiments of the present invention have been described herein in detail, it is to be understood that various alterations, modifications and substitutions can be made therein without departing in any way from the spirit and scope of the present invention, as defined in the claims which follow. For example, although various embodiments have been presented herein with reference to particular functional architectures and algorithmic characteristics, the present inventive structures and methods are not necessarily limited to such a particular architecture or set of characteristics as used herein. It shall be understood the embodiments described herein above can be implemented using either gates or memory elements. Implementing the invention using memory, for example, would provide the same results as when implementing the invention using gates.

What is claimed is:

1. A slot-aligned IQ data buffer for high bit rate communication systems comprising:
   a first data buffer;
   a second data buffer;
   a third data buffer;
   a first data multiplexer in communication with the first data buffer, the second data buffer and the third data buffer and operational to select a pair of data buffers in response to a desired time window;
   a second data multiplexer in communication with the first data multiplexer and operational to select a single on-time data sample in response to a desired sample number;
   a third data multiplexer in communication with the first data multiplexer and operational to select a single late-time data sample in response to a desired sample number;
   a first barrel shifter in communication with the second data multiplexer and operational to select chips that are slot-aligned with incoming frames of data to generate slot-aligned on-time data samples; and
   a second barrel shifter in communication with the third data multiplexer and operational to select chips that are slot-aligned with incoming frames of data to generate slot-aligned late-time data samples.

2. The slot-aligned IQ data buffer according to claim 1 wherein each data buffer is configured to store 64 samples of 6 in-phase bits and 64 samples of 6 quadrature bits.

3. The slot-aligned IQ data buffer according to claim 1 wherein the first, second and third data buffers are configured to be circularly filled with incoming data.

4. The slot-aligned IQ data buffer according to claim 1 wherein the first multiplexer is a 3 to 1 multiplexer.

5. The slot-aligned IQ data buffer according to claim 4 wherein the second and third multiplexers are 4 to 1 multiplexers.

6. The slot-aligned IQ data buffer according to claim 1 wherein two of the data buffers are configured to store 16-chip wide vector data that is capable of being accessed simultaneously during storage of incoming data in the remaining data buffer to provide on-time and late-time energy data.

7. A triple data buffer system for high bit rate communication systems comprising:
   means for storing first signal samples associated with 16 chips of 4× oversampled in-phase bits and 4× oversampled quadrature bits;
   means for storing second signal samples associated with 16 chips of 4× oversampled in-phase bits and 4× oversampled quadrature bits;
   means for storing third signal samples associated with 16 chips of 4× oversampled in-phase bits and 4× oversampled quadrature bits;
   first multiplexing means for selecting signal samples from the stored signal samples in response to a desired time window;
   second multiplexing means for selecting on-time data samples from the signal samples selected in response to a desired time window;
   third multiplexing means for selecting late-time data samples from the signal samples selected in response to a desired time window;
   first barrel shifting means for selecting chips that are slot-aligned with incoming frames of data to generate slot-aligned on-time data samples; and
   second barrel shifting means for selecting chips that are slot-aligned with incoming frames of data to generate slot-aligned late-time data samples.

8. The triple data buffer system according to claim 7 wherein each means for storing signal samples is capable of storing 64 samples of 6 in-phase bits and 64 samples of 6 quadrature bits.

9. The triple data buffer system according to claim 7 wherein the first, second and third means for storing signal samples are configured to be circularly filled with incoming data.

10. The triple data buffer system according to claim 7 wherein the first multiplexing means is a 3 to 1 multiplexer.

11. The triple data buffer system according to claim 10 wherein the second and third multiplexing means are 4 to 1 multiplexers.

12. The triple data buffer system according to claim 7 wherein two of the means for storing signal samples are configured to store 16-chip wide vector data that is capable of being accessed simultaneously during storage of incoming data in the remaining means for storing signal samples to provide on-time and late-time energy data.

13. A triple data buffer system comprising:
   a first chip storage buffer;
   a second chip storage buffer;
   a third chip storage buffer, wherein the first, second and third chip storage buffers are configured to store in combination, forty-eight 4× oversampled contiguous chips;
   a first multiplexer configured to multiplex the first, second and third chip storage buffers to select thirty-one 4× oversampled ½-chips within a desired time window;

a second multiplexer configured to multiplex the first multiplexer to select one sample of thirty-one ½-chips from the thirty-one 4× oversampled ½-chips;

a third multiplexer configured to multiplex the first multiplexer to select one sample of thirty-one ½-chips from the thirty-one 4× oversampled ½-chips;

a first barrel shifter configured to shift bits associated with the sample selected by the second multiplexer to generate 16 slot-aligned on-time samples; and a second barrel shifter configured to shift bits associated with the sample selected by the third multiplexer to generate 16 slot-aligned late-time samples.

14. The triple data buffer system according to claim 13 wherein each chip storage buffer is configured to store 64 samples of 6 in-phase bits and 64 samples of 6 quadrature bits.

15. The triple data buffer system according to claim 13 wherein the first, second and third chip storage buffers are configured to be circularly filled with incoming data.

16. The triple data buffer system according to claim 13 wherein the first multiplexer is a 3 to 1 multiplexer.

17. The triple data buffer system according to claim 13 wherein the second and third multiplexers are 4 to 1 multiplexers.

18. The triple data buffer system according to claim 13 wherein two of the chip storage buffers are configured to store 16-chip wide vector data that is capable of being accessed simultaneously during storage of incoming data in the remaining chip storage buffer to provide on-time and late-time energy data.

* * * * *